United States Patent
Velev et al.

(10) Patent No.: US 11,202,278 B2
(45) Date of Patent: Dec. 14, 2021

(54) COMMUNICATION METHOD, MOBILE TERMINAL, CORE NETWORK NODE, NON-TRANSITORY COMPUTER READABLE RECORDING MEDIUM STORING PROGRAM, AND SYSTEM FOR SELECTING NETWORK RESOURCE

(71) Applicant: NEC Corporation, Tokyo (JP)

(72) Inventors: Genadi Velev, Heidelberg (DE); Iskren Ianev, Heidelberg (DE); Toshiyuki Tamura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/772,900

(22) PCT Filed: Nov. 8, 2016

(86) PCT No.: PCT/JP2016/004834
§ 371 (c)(1),
(2) Date: May 2, 2018

(87) PCT Pub. No.: WO2017/081864
PCT Pub. Date: May 18, 2017

(65) Prior Publication Data
US 2018/0324761 A1  Nov. 8, 2018

(30) Foreign Application Priority Data
Nov. 10, 2015 (EP) ..................... 15193915

(51) Int. Cl.
*H04W 72/04* (2009.01)
*H04W 48/18* (2009.01)
(Continued)

(52) U.S. Cl.
CPC ........... *H04W 72/04* (2013.01); *H04W 48/18* (2013.01); *H04W 8/06* (2013.01); *H04W 8/18* (2013.01); *H04W 84/00* (2013.01)

(58) Field of Classification Search
CPC ....... H04W 72/04; H04W 48/18; H04W 8/06; H04W 8/18; H04W 84/00
See application file for complete search history.

(56) References Cited

U.S. PATENT DOCUMENTS

| 9,749,897 B2 * | 8/2017 | Cho ...................... H04W 28/02 |
| 2005/0090255 A1 * | 4/2005 | Kuchibhotla ......... H04W 48/12 455/435.2 |

(Continued)

FOREIGN PATENT DOCUMENTS

| CN | 1925653 A | 3/2007 |
| EP | 2 663 122 | 11/2013 |

(Continued)

OTHER PUBLICATIONS

International Search Report dated Feb. 9, 2017, in corresponding PCT International Application.

(Continued)

*Primary Examiner* — Michael Thier
*Assistant Examiner* — Nevena Zecevic Sandhu

(57) ABSTRACT

The invention describes a method for detecting an inability to serve a UE in the selected serving node due to mismatch between the UE's DCN-related indication and the UE's DCN-related subscription and/or the UE's capabilities and/or due to serving node congestion. The method allows to update the UE's DCN configuration information, so that the UE can be assigned to an appropriate DCN during the next RRC/NAS request procedure.

8 Claims, 2 Drawing Sheets

Example architecture

(51) Int. Cl.
*H04W 8/06* (2009.01)
*H04W 84/00* (2009.01)
*H04W 8/18* (2009.01)

(56) References Cited

U.S. PATENT DOCUMENTS

| | | | |
|---|---|---|---|
| 2011/0199898 | A1 | 8/2011 | Cho et al. |
| 2012/0252481 | A1* | 10/2012 | Anpat .................. H04W 8/06 455/456.1 |
| 2013/0258967 | A1* | 10/2013 | Watfa .................. H04W 76/00 370/329 |
| 2016/0353465 | A1* | 12/2016 | Vrzic .................. H04W 12/06 |
| 2017/0048695 | A1* | 2/2017 | Ronneke ................ H04W 8/24 |
| 2018/0199278 | A1* | 7/2018 | Duan .................... H04W 48/18 |
| 2018/0310215 | A1* | 10/2018 | Watfa .................. H04W 36/385 |

FOREIGN PATENT DOCUMENTS

| | | |
|---|---|---|
| KR | 10-2006-0010594 A | 2/2006 |
| WO | WO 2015/037882 A | 3/2015 |

OTHER PUBLICATIONS

"3$^{rd}$ Generation Partnership Project; Technical Specification Group Services and System Aspects; Architecture Enhancements for Dedicated Core Networks, Stage 2, (Release 13)", 3GPP TR 23.707, V13.0.0, pp. 1-39, (Dec. 2014).

"3$^{rd}$ Generation Partnership Project; Technical Specification Group Services and System Aspects; Enhancements of Dedicated Core Networks Selection Mechanism; (Release 14)", 3GPP TR 23.711, V0.1.2, pp. 1-17, (Oct. 2015).

"Selection of DCN", SA WG2 Meeting #111, S2-153682, pp. 1-5, (Oct. 2015).

S2-152420, ZTE, "Motivation for Core Network Slicing Study in SA2", 3GPP-TSG SA WG2#110, Jul. 10, 2015.

Office Action, dated Sep. 23, 2020, issued by the Japanese Patent Office in counterpart Japanese Patent Application No. 2018-524294.

Chinese Office Action dated Apr. 10, 2020, issued by the China National Intellectual Property Administration in counterpart Chinese Patent Application No. 201680064994.0.

* cited by examiner

[Fig. 1]
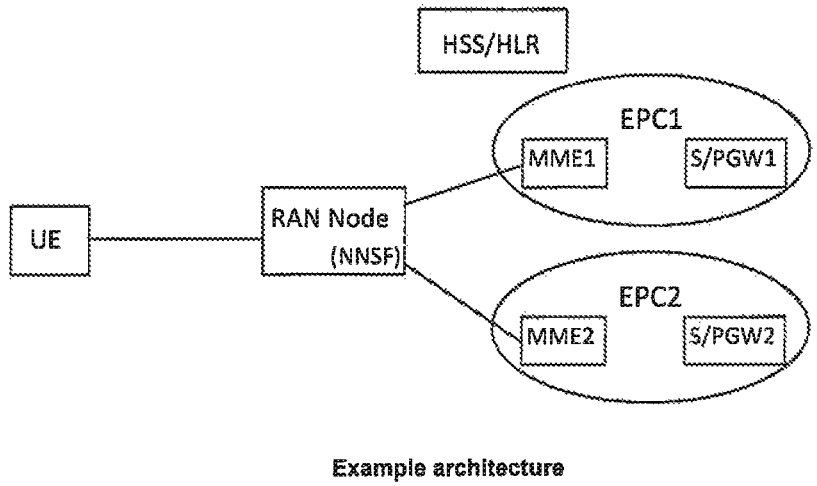
Example architecture
[Fig. 2]
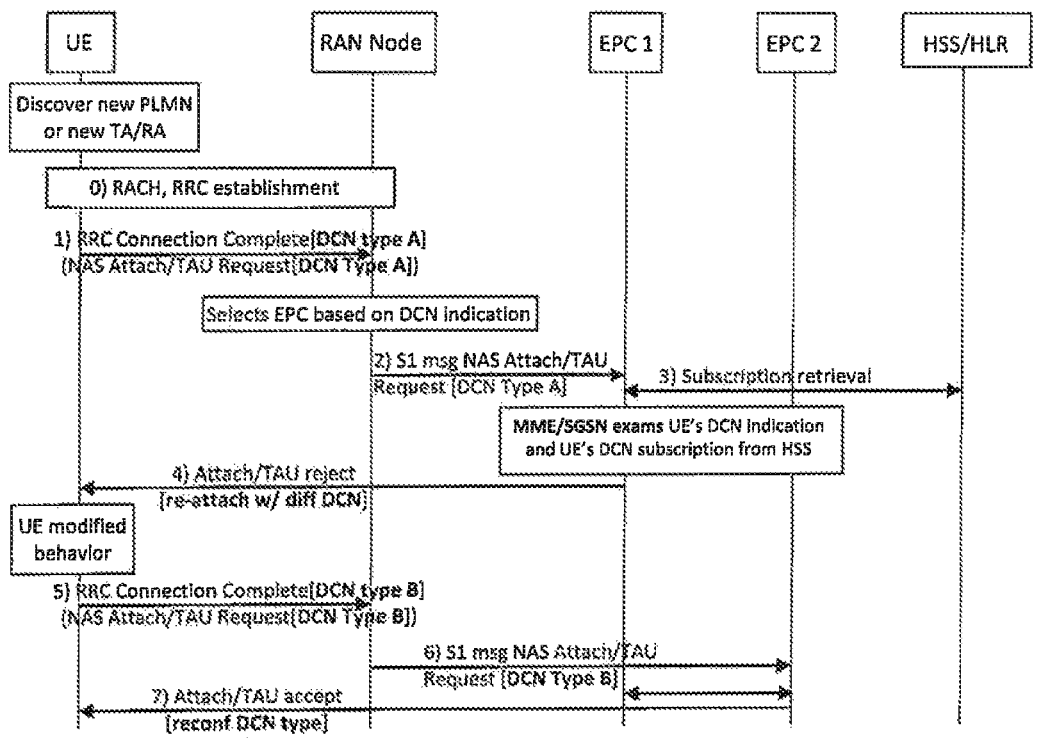
NAS procedure with reject message to UE including DCN-related information

[Fig. 3]
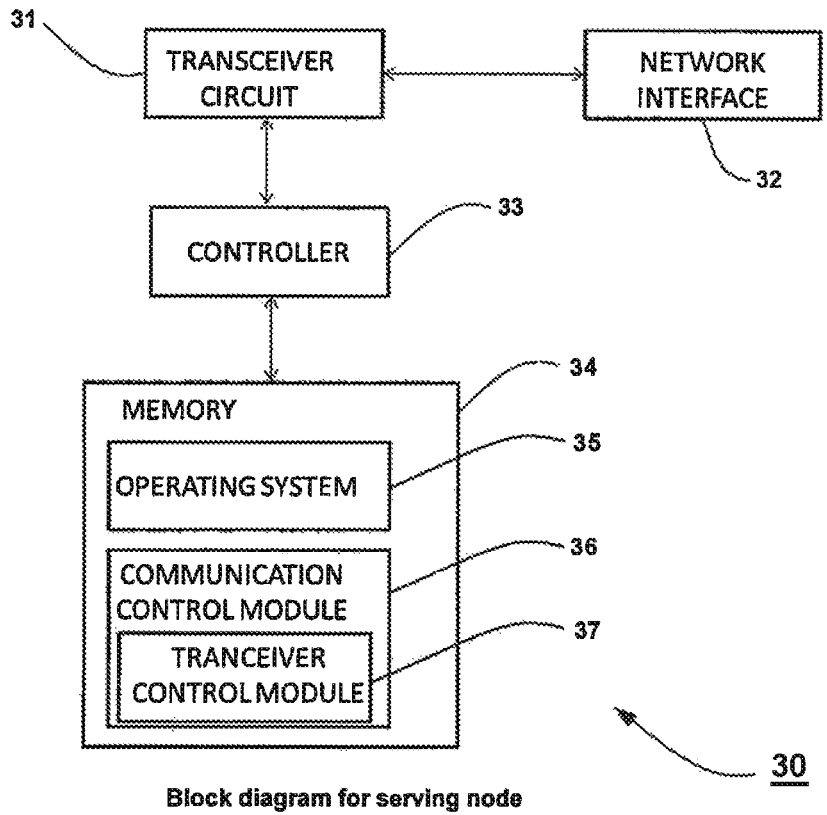
Block diagram for serving node
[Fig. 4]
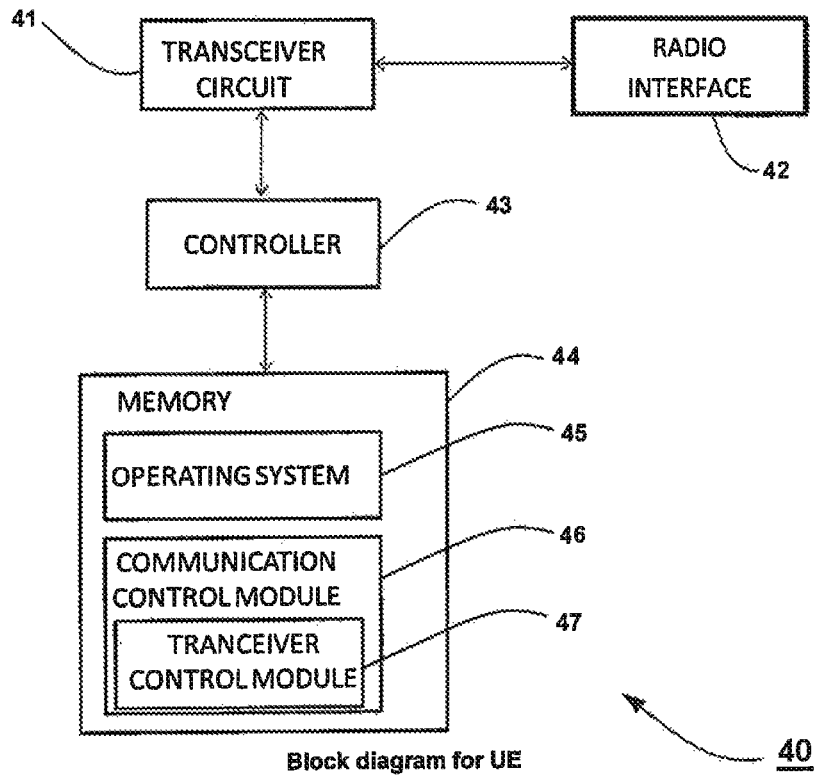
Block diagram for UE

COMMUNICATION METHOD, MOBILE TERMINAL, CORE NETWORK NODE, NON-TRANSITORY COMPUTER READABLE RECORDING MEDIUM STORING PROGRAM, AND SYSTEM FOR SELECTING NETWORK RESOURCE

CROSS-REFERENCE TO RELATED PATENT APPLICATIONS

This application is a National Stage Entry of International Application No. PCT/JP2016/004834, filed Nov. 8, 2016, which claims priority from European Patent Application No. 15193915.4, filed Nov. 10, 2015. The entire contents of the above-referenced applications are expressly incorporated herein by reference.

TECHNICAL FIELD

The present invention relates to mobile communication devices and networks, particularly but not exclusively those operating according to the 3rd Generation Partnership Project (3GPP) standards or equivalents or derivatives thereof, such as the Long Term Evolution (LTE) of the Evolved Packet Core (EPC) network. The invention has particular although not exclusive relevance to the resolving of a mismatch during the dedicated core network selection.

BACKGROUND ART

The following abbreviations and terminology (whenever differently stated) are used in the current invention:

TABLE 1

| | |
|---|---|
| 3GPP | $3^{rd}$ Generation Partnership Project |
| AS | Access Stratum (use similar to RRC signaling in this invention) |
| DCN | Dedicated Core Network |
| NB, eNB | Node B, evolved Node B |
| E-UTRAN | Evolved Universal Terrestrial Radio Access Network |
| GGSN | Gateway GPRS Support Node |
| GPRS | General Packet Radio Service |
| GUMMEI | Globally Unique MME Identifier |
| GUTI | Globally Unique Temporary Identity |
| HPLMN | Home Public Land Mobile Network |
| HSS | Home Subscriber Server |
| IE | Informational Element (used as part of a signalling message) |
| MME | Mobility Management Entity |
| MNO | Mobile Network Operator |
| NAS | Non Access Stratum |
| NNSF | NAS/Network Node Selection Function |
| PCRF | Policy and Charging Rules Function |
| PGW | Packet Data Network Gateway |
| PSM | Power Saving Mode |
| RAU | Routing Area Update |
| RNC | Radio Network Controller |
| RRC | Radio Resource Control |
| PLMN | Public Land Mobile Network |
| SGSN | Serving GPRS Support Node |
| SGW | Serving Gateway |
| TAU | Tracking Area Update |
| UE | User Equipment |
| UTRAN | UMTS Terrestrial Radio Access Network |
| VPLMN | Visited Public Land Mobile Network |

The following terminologies are used within this invention.

The terms 'serving node' or 'MME/SGSN' or 'MSC/SGSN/MME' is generally used through the various embodiments of this invention to describe a functional entity like MSC, or SGSN or MME, or other possible control plane functional entity in the mobile network which terminate the control plane signalling between the core network and the terminal. The serving node (MME/SGSN) can be also a functional entity from future generation networks which is responsible for mobility and session management.

The term HSS/HLR means the repository where the UE's subscription data is stored and can be either an HSS or an R or a combined entity.

The terms 'terminal', or 'device', or 'user terminal' or 'UE' (User Equipment) or 'MT' (Mobile Terminal) are used in an inter-exchangeable manner where all of the terms express the similarly the equipment used to send/receive data and signalling from network or mobile network.

In the recent years the number of mobile terminals with different traffic characteristics is increasing statically including M2M devices and IoT devices connected over the mobile networks. Also, different Applications running on some mobile terminals require specific handling of traffic in the mobile network. In, order to cope with these challenges, the mobile operators are interested to server particular devices on specialized functional network entities (e.g. specialized MME, SGW, PGW, PCRF). These specialized functional network entities can build a so-called overlay networks or dedicated networks.

$3^{rd}$ Generation Partnership Project (3GPP) SA2 working group is currently working on standardisation of Dedicated Core Networks (known as DECOR) which is described in 3GPP TR23.707. The objective of this work item is to enable the deployment of core network functional elements, which are dedicated to subscribers (aka User Equipment, UE) sharing the same or similar characteristics.

While in 3GPP Release 13 the DECOR selection is based on the UE's subscription information in order to enable the deployment for older devices, in 3GPP Release 14 a new study (called enhanced DECOR, eDECOR) is ongoing to enable the selection of DECOR based on UE's indication. With this, eDECOR targets to improve DCN selection mechanism by providing assistance information from the UE. This assistance information complements the Rel-13 DECOR mechanism. This can reduce the signalling required to register to and maintain a DCN.

CITATION LIST

Non Patent Literature

[NPL 1]
3GPP TR 23.707 v1.0.0, Architecture enhancements for dedicated core networks; Stage 2, v13.0.0, 2014 Dec. 17
[NPL 2]
3GPP TS TR 23.711, Enhancements of Dedicated Core Networks selection mechanism; v0.1.2, 2015 Oct. 21

SUMMARY OF INVENTION

Technical Problem

It is not clear currently how the UE assistance information for DECOR (DCN) selection is configured in the UE. This invention presents several options which are described later.

The goal of eDECOR is also to improve the isolation between dedicated core networks since there is no need for redirecting between different DCNs. The updated selection mechanism impacts the UE and RAN but the provisioning of the assistance information may impact the CN. It is advantageous if the solution works when the UE change PLMN.

This invention targets the problem how to deal with a verification failure (e.g. mismatch of UE's subscription or capability or UE's indication) in the network. This may occur in various scenarios, as some exemplary are listed below:

- the UE's DCN-related indication does not match with the subscription information from HSS; or
- in case of "patchy coverage", i.e. in different areas (e.g. rural or urban) the network configuration differs, and UE's DCN indication can be inappropriate; or
- the UE attaches to a visited PLMN (VPLMN) having different configuration from the home PLMN (HPLMN); or
- the UE capabilities does not match to the UE's DCN-indication; or
- the network does not know the DCN indication (or UE Usage Type value); or
- etc.

FIG. 1 shows example architecture where the RAN node (eNB, NB, BS or other RAN functional element) implements a NAS/Network Node Selection Function (NNSF) to select a serving node for the UE. There are 2 overlaying evolved packet core (EPC) networks each containing a serving node (MME1 or MME2) and user plane gateway (SGW1, PGW1, SGW2 and PGW2). The overlaying network can contain a plurality of these nodes, e.g. a pool of MMEs, or SGWs or PGWs, or just some of these nodes, e.g. only serving nodes, but the user plane nodes can be shared. With other words, any configuration is possible. Further, the shown EPC can be also a UMTS CN, thus having SGSN as serving node and GGSN as user plane gateway.

One possible solution would be to use 3GPP Release13 DECOR mechanism, i.e. the network initiates NAS re-route procedure to appropriate DCN. But this re-route procedure may be not always possible as described below.

Problem Description

MME/SGSN may not be able to process the NAS (Attach/TAU) Request msg including UE Decor assistance information (denoted in this invention as UE's DCN-related indication). This may happen e.g. due to the following scenarios:

- temporarily unavailability of particular DCN. For example, the serving node can be temporarily congested (C-plane or U-plane), and thus, not able to process the NAS request message; or
- Depending on the type or value of the UE's DCN-related indication, the indication can be valid only in HPLMN (e.g. the value(s) of the indication are known/supported in the HPLMN). In a VPLMN the UE's NAS message can be always routed to default CN, which is not optimal. With other words, it can be beneficial if the VPLMN let's the UE know that a different DCN-related indication can result in better network service, or at least the VPLMN can benefit if the appropriate DCN is assigned to this UE; or
- a UE's DCN-related subscription retrieved by the serving node during the NAS procedure is not valid anymore (e.g. expired); or
- a UE's DCN-related indication not known not processable) in this PLMN or in this area; or
- there is mismatch btw. UE's DCN-related indication and UE's subscription; or
- there is a mismatch between UE's DCN-related indication (e.g. AS or NAS indications) and terminal capability (e.g. device category, radio capability, paging/coverage enhancements capabilities, etc.). This mismatch can be also detected be the RAN node; etc.

There can be cases where re-routing between DCNs is not possible or not desirable. For example if a MNO configures a strict separation between DCNs, e.g. in case of isolation between dedicated core networks.

Further, the assumption in eDECOR is that the RAN node considering the UE's DCN-related indication performs the NNSF selecting the appropriate serving node or DCN. However, there are cases where the UE's DCN-related indication is not known or not processable at the RAN node, so that the RAN node would select a kind of default serving node for this UE. Thus, the problem is basically forwarded from the RAN to the CN, so that the serving node needs to take actions how to process the UE's NAS request.

Further Problems

Considering network slicing, specific RAN resources can be associated with specific CN resources. "Resources" mean network functions, computing, storing and networking resources. A roaming UE may per default attach to common resources, but the UE may need to be redirected to specific RAN (+CN) resources, i.e. new RAT/RAN selection may be needed.

Solution to Problem

In order to solve the above described problem, different solutions are described in various example embodiments herewith.

The main idea of the present invention is to provide a mechanism to reject and/or to inform (e.g. in order to redirect) the UE about an error, mismatch or congestion in the network. As result the UE performs actions in order to connect to an appropriate RAN/DCN using a NAS procedure.

The main features of the current invention include the following:

- The serving node (MME/SGSN) is able to determine at least one of the following situations:
  - a UE's DCN-related indication (e.g. DCN-related subscription) is not valid (e.g. expired), or
  - a UE's DCN-related indication not known not processable) in this PLMN or in this area, or
  - there is mismatch btw. UE's DCN-related indication and UE's subscription, or
  - there is a mismatch between UE's DCN-related indication and terminal capability.
- The serving node (MME/SGSN) rejects the UE and provides reason for rejection (e.g. reject cause). The MME/SGSN can also provide information to the UE to re-initiate (immediately or later) the NAS procedure (Attach/TAU request) with possibly different indication to the RAN node or to a different RAN/RAT.
  Serving node uses NAS (Attach/TAU/RAU) Reject msg towards UE to provide this information
- The information from the serving node (MME/SGSN) to the UE indicates at least one of the following possible behaviours for the UE (note that the list is not exclusive):
  - a new reject cause indicating to the UE that the UE's DCN-related information in the NAS request is not valid (or not known, or not processable) and/or the UE should use different DCN-related information at next (RRC or NAS) connection attempt; and/or
  - a new reject cause indicating a mismatch between UE's DCN-related information and the device type or subscription information; and/or
  - a new cause/flag to re-attach without using DCN-related information, and/or a new DCN-related information to use for re-attach optionally including the validity or applicability of the DCN-related information, and/or to perform RAT/RAN reselection towards specific RAT/RAN, and/or to perform PLMN reselection and re-attach with a particular PLMN, and/or to perform later NAS request procedure due to network/serving node congestion, but also using updated DCN-related indication, e.g. for this PLMN etc.

The UE is able to process the received indication and the UE behaves correspondingly e.g. sending NAS (Attach/TAU/RAU) request with modified information to RAN and EPC.

BRIEF DESCRIPTION OF DRAWINGS

FIG. 1 shows example architecture where the RAN node (eNB, NB, BS or other RAN functional element) implements a NAS/Network Node Selection Function (NNSF) to select a serving node for the UE;

FIG. 2 shows an exemplary signaling flow for a main example embodiment of this invention based on NAS or AS request procedure initiated by the UE;

FIG. 3 is a block diagram schematically showing a serving node (MME/SGSN/MSC) for use in example embodiments of this invention; and FIG. 4 is a block diagram schematically showing a mobile terminal or use in example embodiments of this invention.

DESCRIPTION OF EMBODIMENTS

Note that in the following description the term "dedicated core network" can be considered as (1) a single network function, e.g. control plane functions like MME and/or SGSN, and/or PCRF, or (2) user plane network function like SGW, PGW, GGSN, or (3) a set of control plane and user plane functions. The specific dedicated core network that serves a UE is selected based on UE's subscription information and operator configuration.

The term 'DECOR' is used as Dedicated Core Network in the sense of mobile network, but can be also applied to a Radio Access Network (RAN), or can be applied to the mobile network (RAN and CN) as whole, or can be applied to a fixed network or any type of communication networks, where not only the Core part, but also the access network part are considered. The solutions described in the embodiments in this invention may also apply to selection of an appropriate network slice, considering 5G networks.

The terms UE assisted DCN information and UE's DCN-related information are used to represent same information configured in the UE to be indicated to the network for DCN selection. The 'DCN-related information' can be carried from the UE to the network, but also from the network to the UE, e.g. used for updating the UE's configuration. The 'DCN-related information' can be carried in RRC signalling and/or in NAS signalling and/or in S1-AP/backhaul signaling (the latter meaning from RAN node to the serving node).

It should be noted that the terms RRC (Radio Resource Control) and AS (Access Stratum) are used in a similar manner in this invention denoting e.g. the signaling over the radio interface between UE and RAN node. In future mobile network any other name for these terms can be used applying with the same or similar meaning.

Correspondingly, the term NAS (Non-Access Stratum) is used as a general term for the direct signaling between the UE and Core network, e.g. serving node. Any other terms with same or similar meaning can be applied for future network technologies.

This invention assumes different options for the initial configuration of the UE assisted DCN indication (e.g. DCN-related information) in the UE. One option would be that the UE's DCN-related information is configured in the (U)SIM card and corresponds to the UE's subscription in the HSS/HLR. When the UE/device is powered on, the DCN-related information is downloaded from the (U)SIM card on the device and used by the NAS layer for NAS indication or RRC indication. Another option would be to configure the information in the device (or modem, or UE) via Open Mobile Alliance Device Management (OMA-DM) or Over-The-Air (OTA) signaling from the network operator. In such a case the DCN-related information is stored on a memory (e.g. EPROM) in the UE and used when necessary for NAS signaling and/or AS (e.g. RRC) signaling.

Another solution to configure the DCN-related information in the UE is to use NAS signaling from the network. This can happen when the UE attaches for the first time to the network (e.g. to particular PLMN) and during the attach procedure the network configures the DCN-related information in the UE. For example the network (e.g. the serving node) can derive based on the UE's subscription which DCN-related indication shall the UE announce during AS or NAS connection establishment and configure this information in the UE using for example Attach Accept or Attach Reject, or other appropriate NAS procedures (e.g. NAS (E)MM procedure or message like 'EMM Information', 'EMM status', 'Notification' or other NAS message or extensions of them) from the serving node to the UE. The NAS signaling message with DCN-related configuration information can also contain a validity of this information, e.g. for the given PLMN, a validity time, or until the UE detaches from the network.

Optionally the NAS signaling message with DCN-related configuration information can contain various conditions under which the DCN-related indication should be sent towards the network. For example the DCN-related information may be omitted in the AS or NAS signaling in particular cases of network status, e.g. during emergency session requests or during baring conditions, etc. With this, the UE decides whether to indicate the DCN-related parameter based on information broadcasted in the system information (SIB).

The UE stores the received DCN-related information with the corresponding validity information and/or other assisted DCN information (for different conditions).

Some examples are listed below about the validity of the DCN-related information, i.e. how long does the DCN-related information apply or in which case does it apply. Below several possible solutions are listed:

The UE stores and uses the DCN-related information until there is re-configuration again.

A validity timer can be associated with the DCN-related information. After expiration of the timer, the UE deletes and stops using the DCN-related information with or without an explicit signaling to the network.

The DCN-related can be valid in a certain geographic area, e.g. in given cell(s), tacking area(s) or PLMN(s) or equivalent PLMN(s). This validity information is signaled from the network to the UE as part of the DCN-related information for configuration. The UE can store the DCN-related information and use it as long as the UE camps or tries to establish AS and NAS connections in the validity area/region. For example, if the UE performs AS/NAS procedures to connect to the same PLMN or equivalent PLMNs which configured the DCN-related information into the UE, then the UE uses the particular DCN-related information. However, if the UE performs AS/NAS procedure in another geographic area, the UE may use default DCN-related information or omit any DCN-related information in the AS/NAS procedure.

FIG. 2 shows an exemplary signalling flow for a main example embodiment of this invention based on NAS or AS request procedure initiated by the UE. The NAS request procedure may be an Attach request procedure, or TAU request procedure or RAU request procedure. The description of the steps is provided below:

Step (0)

The UE initiates a NAS (Attach, TAU or RAU) request procedure towards the network. This NAS request may result from UE mobility and changing geographic area, or loosing network coverage and reselecting another PLMN or other reasons. The UE initiates RRC establishment procedure.

Step (1)

During the RRC Connection Complete message the UE may include DCN-related information to indicate to the RAN node the UE's type or network type to be used. The RRC Connection Complete message includes the NAS request message. This encapsulated NAS request message may also include DCN-related information or other indication to be used by serving node. In the example of FIG. 1, the UE indicates 'DCN type A' in the RRC Connection Complete message. The eNB processes the RRC Connection Complete message and executes the NAS/Network Node Selection Function (NNSF) in the RAN node, which in this example is equivalent to DCN selection procedure. The eNB takes into consideration the UE's IDs like S-TMSI, but also the DCN-related information in order to select.

Step (2)

The RAN node sends the over S1 signalling the UE's NAS message to the selected serving node. In FIG. 2 the serving node is depicted as part of the EPC (Evolved Packet Core). The eNB may also send in the S1-AP signalling the DCN-related information indicated by the UE in the RRC message.

Step (3)

After receiving the NAS request message, the serving node verifies the message and retrieves the subscription context from an old serving node or from the HSS/HLR. The serving node (MME/SGSN) exams the matching between the UE's DCN-related information sent over NAS signalling, optionally over S1-AP signalling from eNB and the UE's subscription from HSS. Further the serving node in EPC1 examines other relevant data from the UE's subscription and/or from UE's indications to the network. If the serving node detects a problem, or an error, or a mismatch as described exemplary in the following cases, the serving node decides to reject the NAS request with a corresponding cause or information to the UE, so that the UE knows how to behave. The following examples of error/mismatch detection are exemplary and non-exclusive:

a) Temporarily unavailability of particular DCN or DCN congestion and wrong serving node selection by the RAN node. For example this is possible in case of C-plane (or U-plane) congestion, where the serving node is not able to process the UE's NAS request and NAS reject with BOT is applied. Additionally the RAN node may select an inappropriate serving node, e.g. in case of UE is roaming where the DCN-related indication in the RRC signalling can be processes correctly by RAN node. In such a case after expiration of the BOT timer the UE again be routed to the wrong serving node. Therefore it is proposed that additionally to the BOT timer, the serving node sends a DCN-related information to update the UE's configuration in the NAS reject message. In this way the UE would use this updated information in the RRC and/or NAS DCN-related indication during the next RRC and/or NAS procedure. Further, example embodiment (A) below describes additional details to this solution.

b) As stated in the problem description section, depending on the type or value of the UE's DCN-related indication, the indication can be valid only in HPLMN (e.g. the value(s) of the indication are known/supported in the HPLMN). In a VPLMN the UE's NAS message can be always routed to non-optimal default CN. This invention proposes that the serving node in the VPLMN's EPC1 updates the UE's DCN-related configuration with new DCN-related indication value(s) which will allow the NNSF in the RAN node to select the appropriate serving node or DCN The serving node can determine the new DCN-related configuration for update in the UE based on the UE's subscription (e.g. from the HPLMN's HSS/HLR). The serving node can process the UE's subscription, particularly the DCN-related part and based on local configuration in the VPLMN, the serving node determines which DCN-related indication the UE can use in this VPLMN. So, the serving node uses the NAS reject procedure to inform the UE to update UE's DCN-related indication towards the RAN and/or towards the CN for this VPLMN (or equivalent PLMNs).

c) A UE's DCN-related indication or DCN-related subscription from HSS is not valid (e.g. expired). This case is described in more details an embodiment below. This is elaborated in example embodiment (C) below.

d) A UE's DCN-related indication not known (or not processable) in this PLMN or in this area.

e) There is mismatch btw. UE's DCN-related indication and UE's subscription. This may happen if the UE's DCN-related configuration has been changed by e.g. OMA-DM or OTT, or NAS signalling from some PLMN, but the UE's subscription has not been changed. In this case the serving node would notice a mismatch. One solution is that the UE's subscription information takes precedence over UE's indication for the decision in the serving node. In addition, the UE's configuration should be updated. Further, the serving node may determine that if the UE would have been configured with the updated DCN-related information, the UE may have behaved differently, e.g. select a different RAT (e.g. NB-IoT or UE-NI, or eMTC RATs) and/or the UE may by using different DCN-relate indication towards the RAN, the RAN node would have selected different serving node, then the serving should send the updated DCN-related information to the UE, optionally with indication to re-attempt the RAN and NAS signalling with the updated information and/or to reselect the RAN/RAT if needed. For example the UE supporting NB-IoT and eMTC (or LTE-M) technology attempts to attach to a VPLMN. If the UE uses non-CIoT Attach procedure, the serving node (depending on the UE subscription data, traffic pattern profile, subscribed application, etc) decides that UE shall use the NB-IoT RAT. For this purpose the serving node may send NAS reject message including indication for selection of NB-IoT RAT. The UE behaves correspondingly and performs a RRC connection re-establishment via other radio resources. This particular solution can be applied for reselections of any other radio or non-radio technology (e.g. 3GPP RAT, WLAN or fixed line technology).

f) There is a mismatch between UE's DCN-related indication (or DCN-related subscription) and the terminal capability or type of device e.g. indicated during RRC connection establishment towards the RAN node. This is described in detail in example embodiments (B) and (D) below.

Step (4)

The serving node sends NAS reject message to the UE indicating a corresponding reject/error cause and/or additional DCN-related information to the UE. The DCN-related information includes (1) DCN indication to be used by the UE in AS and/or NAS signalling, and/or (2) validity of the carried DCN-related information (e.g. timer, geographic area like cells, PLMN, etc.), and/or (3) applicability of the information depending on network conditions. The UE is able to process the DCN-related information and the UE should behave correspondingly. Possible indications to the UE in the NAS reject message are as follows:

a) a new reject cause indicating that the UE's DCN-related information in the NAS request is not valid (or not known, or not processable) and/or the UE should use different DCN-related information at next (RRC or NAS) connection attempt; and/or b) a new reject cause indicating a mismatch between UE's DCN-related information and the UE's subscription information. This case is related to step (3) point e); and/or c) a new flag for re-attach with different DCN indication, and/or d) a new DCN-related information to be uses by the UE to reconfigure its DCN-related information and to be used in later RRC or NAS procedures. Optionally this DCN-related information contains usage information, e.g. whether the updated DCN-related information is used in the radio (e.g. AS or RRC) signalling and/or in the NAS signalling, and/or e) to perform RAT/RAN reselection towards specific RAT/RAN. For example this possible indication is according to step (3) point e), and/or f) to perform PLMN reselection and re-attach with a particular PLMN, and/or g) to perform later NAS request procedure due to network/serving node congestion, but also using updated DCN-related indication, e.g. for this PLMN etc.

Step (5)

Depending on the reject/error cause included in the NAS reject message, the UE performs corresponding actions, e.g. RAT/RAN or PLMN reselection, storing an updated DCN-related information, etc. FIG. 2 shows one possible action where the UE initiates a new NAS request procedure with updated DCN-related indication. For this purpose, the UE initiates a RRC connection establishment with updated DCN-related information, e.g. indicating 'DCN Type B'. However, in an alternative solution, the RAN node and the UE may not release the RRC connection, but instead the signalling radio bearers, i.e. the already established RRC connection, but the UE sends the updated DCN-related indication over existing or new RRC message to the RAN node. This message can include the NAS request message. The RAN node would be then able to execute the NNSF function and select an appropriate serving node.

Step (6)

The Network Node Selection Function (NNSF) in the RAN node selects a serving node corresponding to the updated UE's DCN-related information, e.g. serving node from EPC2. The RAN node forwards the UE's NAS request message to the serving node from EPC2. The serving node from EPC2 retrieves the UE's context from an old serving node (e.g. the serving node corresponding to the used S-TMSI in the RRC connection complete message) from the HSS. The serving node exams the UE's DCN-related indication and the UE's subscription. If the examination is successful, i.e. no errors or mismatch has been detected, the serving node continues with the next steps of the corresponding NAS procedure (e.g. establishing default EPS bearers in case of Attach procedure, etc.).

Step (7)

The serving node from EPC2 sends NAS accept message to the UE.

In a particular example embodiment (A) of the current invention, the case in FIG. 2, step 3 point a) is elaborated a bit more. The serving node receiving the UE's NAS request message containing DCN-related indication can process the indication and can determine that another serving node (or DCN) is appropriate (i.e. re-routing should be performed), but 1) either the receiving serving node is temporarily congested/overloaded (in the control plane or user plane) or 2) the current serving node is aware that the possible target serving node is temporarily congested/overloaded.

The current serving node can know about the congestion status of a target node e.g. via extended S10 signalling which is able to carry congestion/load/overload information or via other OAM or transport network mechanisms (e.g. Heartbeat mechanisms or Internet Control Message Protocol (ICMP) mechanism, etc.).

In such a case of congestion and need of NAS message reroute (as described above) the current serving node may reject the NAS request from the UE with a back-off timer (BOT). The BOT indicates that the UE should initiate the NAS procedure after expiration of the BOT time. After the BOT expires the UE will initiate the NAS procedure and the NAS message will be probably forwarded to the same serving node, which need to start the DECOR re-route procedure.

In order to avoid the DECOR re-route procedure after the BOT expiration, this invention proposes that the serving node sends a NAS reject message to the UE including new DCN-related information in addition to the BOT time. After receiving such indication, the UE starts the BOT timer and after its expiration, the UE initiates a NAS request procedure with updated DCN-related indication towards the network, e.g. in RRC signaling and/or in NAS signaling.

In yet another example embodiment (B), the serving node (MME/SGSN) can detect a mismatch between the DCN-related indication and the type of device. This is possible in the case where the DCN-related information from the UE comes from the (U)SIM card, and the (U)SIM card is misplaced in a wrong device. Alternatively, in case of embedded SIM, the SIM configuration can be performed in a wrong device. In such case, the network should be able to detect such a mismatch between DCN-related indication and the type of device. In such case of mismatch, the NAS request (e.g. Attach request) procedure will be successful, but the UE will be connected with the wrong PGW. The question is how the network detects the mismatch.

This example embodiment also applies to Release 13, where the UE is not changed, but the HSS/HLR provides subscription information for DCN selection (aka UE Usage Type), the serving node can determine mismatch or an error when processing the DCN-related subscription information and the device capabilities.

In one possible solution the UE indicates its category/capability in the RRC connection request, e.g. "Cat.6" or "Cat.0" device, etc. When the UE's NAS request containing DCN-related indication arrives at the MME/SGSN together with the S1-AP indication from the RAN node (eNB) about UE's capability, the MME/SGSN can detect a possible mismatch by comparing the device capability and UE's DCN indication/subscription. For example:

Cat.6 device (i.e. high-end device capable of 20 MHz bandwidth) and DCN-related indication saying "Small Data" are deemed as incompatible; or Cat.0 device (i.e. low-end device able of sending limited data-rate) and DCN-related indication "surveillance camera" (which needs high uplink bandwidth) are deemed as incompatible.

Device indicating Release 13 "coverage enhancements" or "paging optimizations" would mean that this is a static device in bad coverage location. In the same time indicating DCN type of e.g. 'high mobility' may lead to inconsistence. Then the MME may send Attach reject with some corresponding cause e.g. "mismatch of Dev. capability and DCN indication".

In another possible solution in this example embodiment, the MME/SGSN detects mismatch of Device ID (e.g. IMEI) and DCN-indication (or subscription ID as IMSI). It is assumed that the device ID, e.g. IMEI (International Mobile Station Equipment Identity), is provisioned in the Equipment Identity Register (EIR) or in the HSS. The MME/SGSN can make a first check of DCN-related indication and Device capability as described above, and if the MME/SGSN detects inconsistence, the MME can perform the second check of Device ID and subscription ID.

In case of mismatch, the MME/SGSN sends Attach reject with some corresponding cause e.g. "mismatch of Device ID and subscription II) (IMSI)".

After receiving any of the exemplary indications in the NAS reject message (e.g. "mismatch of Dev. capability and DCN indication", "mismatch of Device ID and subscription ID"), the UE may display an error indication to the User of the Device/UE, so that the User can undertake corresponding actions, e.g. exchanging the (U)SIM card. For example a lamp or LED at the device may start blinking or an error message may be shown on the display.

Another optional resolution of the problem is that the serving node or EPC may start communication towards the Device owner or Application owner/operator to inform them about the error case. For this purpose the network may implement a system or database which stores the contact details (IP address, name) of the party which should be informed in case of error. As a solution example, extensions to MONTE (specified in Rel-13) feature can be used to contact particular SCS/AS corresponding to the device/subscription for which the error/mismatch was detected.

In another alternative solution, the serving node can include in the NAS reject message a reject cause indicating an error or mismatch of the DCN-related information without any additional assistance information to the UE. Then the UE can determine how to behave and which (if any at all) DCN-related information to use in the consequent RRC or NAS signalling. This solution option can be denoted as UE-centric solution without network assistance.

The UE should implement internal logic which allows to process the reject cause and to determine the next actions to be performed. For example, the UE can omit sending any DCN-related information during the next RRC/NAS connection establishment, so that the RAN node can select a serving node based merely on the device capabilities and device temporary IDs (e.g. S-TMSI).

The solution options described in this example embodiment (B), solve the detected mismatch or errors (1) due to mismatch between device type/capability and subscription, and (2) due to the processing of the DCN-related indication from UE and/or UE's DCN-relate subscription information.

In yet another example embodiment (C) the UE's subscription for a specific DCN type (e.g. UE Usage Type) may have expired or not valid any more. When the MME/SGSN verifies with the HSS the DCN subscription indication from the UE, the verification may fail if the UEs subscription for a DCN (e.g. UE Usage Type) has expired or no longer valid for some reason. In this case the MME/SGSN shall reject the NAS message from the UE with either a suitable existing reject cause or with a new reject cause, e,g, 'DCN subscription expired' or 'UE Usage Type subscription expired' or any other name for the reject cause with the same or similar meaning. On receiving the NAS message (Attach/TAU/RAU) Reject message) with such a cause, the UE shall display the reject cause and shall not attempt another access to the network for a defined time or until its DCN subscription is renewed or resolved.

The solutions described in the embodiments through this invention can be applied also for selection of an appropriate network slice, e.g. considering future network architectures. In such a case, the DCN-related information (indication or subscription) as used within this invention can be represented in a different way as slice-related information (indication or subscription) or any other name with the same or similar meaning. More importantly, not the name but the meaning and the resulting actions are important for such a slice-related information. The slice-related information would be used in UE (or 5G terminal) to select the correct slice including the correct RAN resources or RAT. This would be a kind of UE-centric solution for slice selection. For this selection, the UE monitors the broadcasted radio information and decide over which radio resources (or RAT) to perform the attach or connection procedure. However, sometimes the network may not want to broadcast the network internal configuration or configured slices. With other words, the operator would like to hide the network slice configuration. Then the UE would need to send indication to the network, so that the network can redirect the UE to the appropriate slice. To perform this, any of the example embodiments described above can be applied to reconfigure the slice-related information in the UE and to use the updated configuration to select the appropriate network slice.

In yet another example embodiment (D), the scenario is considered where the RAN node and more specifically the NNSF selects a serving node for the UE establishing an RRC connection. It is already mentioned in the problem description that there may be a mismatch between the device capability indication and the DCN-related indication from the UE. This mismatch can be detected optionally by the RAN node. For example the UE can indicate capabilities for paging optimization and/or coverage enhancement features which has been discussed in 3G-PP Release 13 in addition to the UE category type (e.g. Cat.0, Cat.1, etc.) and other capabilities like Carrier Aggregation etc. Further, the UE can also indicate the eDECOR UE-assisted information (i.e. DCN-related information) in the RRC signaling. Basically the RAN node takes into consideration the indications for supported Category or paging optimization and/or coverage enhancement, but also the eDECOR (Release 14) UE-assisted info in the RRC signaling to take a decision for the serving node selection.

It is assumed that the RAN node has sufficient information (e.g. via configuration over OAM or S1-MME interface signaling) about the abilities of the connected serving nodes. The selection of the serving node at the RAN node may not be easy (i.e. it is ambiguous), as different UE's indications may result in selecting to different serving nodes. In such a case of mismatch, one possible solution is that the RAN node selects a default serving ode. Another possible solution is that the RAN node selects any appropriate MME. The RAN node forwards the information in the S1-AP signalling to the selected serving node, but in addition the RAN can also forward specific indications received from the UE during the RRC connection establishment. With other words, the RAN node informs the serving node about the mismatch between AS indications from the UE. For example the RAN node can forward to the serving node information about the paging optimization and/or coverage enhancement, and/or MTC-specific feature support and/or cellular IoT-specific or any other similar indications.

It is assumed that the serving node has more information about the UE (e.g. from the UE's subscription information, APN or application information, or gathered statistics or from other sources), so that the serving node can take a more appropriate solution then the RAN node about the serving node selection or DCN selection. Then the serving node can apply for example any solution described in other embodiments in this invention.

According to the example embodiments in this invention, the serving node (MME/SGSN/MSC) should be modified/extended to be able to behave according to the proposed solution(s). The serving node 30 can be described schematically via the block diagram as in FIG. 3:

As shown in FIG. 3, the serving node 30 comprises a transceiver circuit 31 and a network interface 32 for transmitting signals to and for receiving signals from other network entities. The serving node 30 comprises a controller 33 to control the operation of the serving node 30. The controller 33 is associated with a memory 34.

Software may be pre-installed in the memory 34 and/or may be downloaded via a communication network or from a removable data storage device (RMD), for example. The controller 33 is configured to control the overall operation of the serving node 30 by, in this example, program instructions or software instructions stored with in the memory 34. As shown, there software instructions include, among other things, an operating system 35 and a communication module 36.

The communication control mode 36 controls the communication between the serving node 30 and other network entities that are connected to the serving node 30. The communication control node 36 includes a transceiver control module 37.

According to the example embodiments in this invention, the mobile terminal (e.g. a UE) is modified to be able to handle the signaling to/from the network. The mobile terminal 40 can be described schematically via the block diagram as in FIG. 4.

As shown in FIG. 4, the mobile terminal 40 comprises a transceiver circuit 41 and a radio interface 42 for transmitting signals to and for receiving signals from the RAN node. The mobile terminal 40 comprises a controller 43 to control the operation of the mobile terminal 40. The controller 43 is associated with a memory 44.

Software may be pre-installed in the memory 44 and/or may be downloaded via a communication network or from a removable data storage device (RMD), for example. The controller 43 is configured to control the overall operation of the mobile terminal 40 by, in this example, program instructions or software instructions stored with in the memory 44. As shown, there software instructions include, among other things, an operating system 45 and a communication module 46.

The communication control mode 46 controls the communication between the mobile terminal 40 and the RAN node connected to the mobile terminal 40. The communication control node 46 includes a transceiver control module 47.

While the invention has been particularly shown and described with reference to example embodiments thereof, the invention is not limited to these embodiments. It will be understood by those of ordinary skill in the art that various changes in form and details may be made therein without departing from the sprit and scope of the present invention as defined by the claims.

This application is based upon and claims the benefit of priority from European Patent application No. EP15193915.4, filed on Nov. 10, 2015, the disclosure of which is incorporated herein in its entirety by reference.

The invention claimed is:

1. A communication method for a core network node, the communication method comprising:
receiving a Non-Access Stratum (NAS) message comprising information of a first network slice, from a mobile terminal via an access network node;
retrieving subscription information from a core network control plane network function;
verifying the information of the first network slice based on relevant data of the subscription information;
determining a value of information of a second network slice to be used by the mobile terminal in a case in which a value of the information of the first network slice is valid only in a Home Public Land Mobile Network (PLMN) of the mobile terminal; and
transmitting a NAS accept message including the information of the second network slice,
wherein the value of the information of the second network slice is valid in a PLMN including the core network node.

2. The communication method according to claim 1, wherein the core network node is selected by the access network node as a default core network node in a case in which the access network node cannot select an appropriate core network node based on the information of the first network slice.

3. A communication method for a mobile terminal, comprising:
transmitting a Non-Access Stratum (NAS) message comprising information of a first network slice, to a core network node via an access network node; and
receiving a NAS accept message comprising information of a second network slice to be used by the mobile terminal, from the core network node via the access network node, in a case in which a value of the information of the first network slice is valid only in a Home Public Land Mobile Network (PLMN) of the mobile terminal;
transmitting another NAS message comprising the information of the second network slice, to the core network node, wherein a value of the information of the second network slice is determined by the core network node.

4. The communication method according to claim 3, wherein the core network node is selected by the access network node as a default core network node in a case in which the access network node cannot select an appropriate core network node based on the information of the first network slice.

5. A core network node, comprising:
a receiver configured to receive a Non-Access Stratum (NAS) message comprising information of a first network slice, from a mobile terminal via an access network node; and
at least one processor configured to:
retrieve subscription information from a core network control plane network function;
verify whether the information of the first network slice matches with relevant data of the subscription information;
determine a value of information of a second network slice to be used by the mobile terminal in a case in which a value of the information of the first network slice is valid only in a Home Public Land Mobile Network (PLMN) of the mobile terminal; and
a transmitter configured to transmit a NAS accept message including the information of the second network slice to be used by the mobile terminal,
wherein the value of the information for the second network slice is valid in a PLMN including the core network node.

6. A mobile terminal, comprising:
a transmitter configured to transmit a Non-Access Stratum (NAS) message comprising information of a first network slice, to a core network node via an access network node; and
a receiver configured to receive a NAS accept message comprising information of a second network slice to be used by the mobile terminal, from the core network node via the access network node, in a case in which a value of the information for the first network slice is valid only in a Home Public Land Mobile Network (PLMN) of the mobile terminal;
at least one processor configured to update the information of the first network slice,
wherein a value of the information of the second network slice is determined by the core network node, and
wherein the value of the information of the first network slice indicates a Public Land Mobile Network (PLMN) or a registration area where the information of the first network slice is not valid.

7. A non-transitory computer readable recording medium storing a computer program comprising computer implementable instructions, the computer program causing a programmable communications device to perform a communication method for a core network node, the method comprising:
receiving subscription information from a core network control plane network function;
verifying information of the first network slice based on relevant data of the subscription information;
determining a value of information of a second network slice to be used by a mobile terminal in a case in which a value of the information for the first network slice is valid only in a Home Public Land Mobile Network (PLMN) of the mobile terminal; and
transmitting a Non-Access Stratum (NAS) accept message including the information of the second network slice,
wherein the value of the information for the second network slice is valid in a PLMN including the core network node.

8. A system comprising a core network node and a mobile terminal,
wherein the mobile terminal comprises a transmitter configured to transmit a Non-Access Stratum (NAS) message including information of a first network slice to the core network node via an access network node,
wherein the core network node comprises:
at least one processor configured to:
retrieve subscription information from a core network control plane network function;
verify the information of the first network slice based on relevant data of the subscription information; and
determine a value of information of a second network slice to be used by the mobile terminal in a case in which a value of the information for the first network slice is valid only in a Home Public Land Mobile Network (PLMN) of the mobile terminal; and
a transmitter configured to transmit a NAS accept message comprising the information of the second network slice,
wherein the value of the information for the second network slice is valid in a PLMN including the core network node, and
the value of the information of the first network slice indicates a Public Land Mobile Network (PLMN) or a registration area where the information of the first network slice is not valid.

* * * * *